United States Patent
Ness

(10) Patent No.: US 12,455,092 B2
(45) Date of Patent: Oct. 28, 2025

(54) SYSTEM AND METHOD FOR SEALING AND PRESSURIZING ENCLOSED FACILITIES VIA PREFABRICATED MODULES, PLUGS, DOORS, AND INSERTS

(71) Applicant: Peter Ness, Tokyo (JP)

(72) Inventor: Peter Ness, Tokyo (JP)

( * ) Notice: Subject to any disclaimer, the term of this patent is extended or adjusted under 35 U.S.C. 154(b) by 0 days.

(21) Appl. No.: 17/557,218

(22) Filed: Dec. 21, 2021

(65) Prior Publication Data

US 2023/0194118 A1    Jun. 22, 2023

(51) Int. Cl.
*E21F 7/00* (2006.01)
*E02D 29/045* (2006.01)
*F24F 11/72* (2018.01)
*E21F 1/14* (2006.01)

(52) U.S. Cl.
CPC ............ *F24F 11/72* (2018.01); *E02D 29/045* (2013.01); *E21F 7/00* (2013.01); *E21F 1/14* (2013.01)

(58) Field of Classification Search
CPC ....... E21F 7/00; E21F 1/10; E21F 1/14; E21F 1/45
USPC .................................. 299/12; 454/168–172
See application file for complete search history.

(56) References Cited

U.S. PATENT DOCUMENTS

| | | | |
|---|---|---|---|
| 963,787 A * | 7/1910 | Martin | |
| 1,594,921 A * | 8/1926 | Barnett | E21D 5/11 |
| | | | 454/169 |
| 2,508,949 A * | 5/1950 | Howard | E21F 7/00 |
| | | | 454/168 |
| 2,523,273 A * | 9/1950 | Blundell | E21F 7/00 |
| | | | 454/168 |
| 4,023,372 A * | 5/1977 | Presler | E21F 17/107 |
| | | | 405/289 |

* cited by examiner

*Primary Examiner* — Sunil Singh
(74) *Attorney, Agent, or Firm* — The Rapacke Law Group, P.A.

(57) ABSTRACT

A method of sealing and pressurizing underground facilities in planetary bodies with atmospheric pressures or temperatures differing from that of earth may include disposing at least one prefabricated, airtight plug within the tunnel system prior to forming additional tunnels or shafts within the tunnel system. Multiple plugs may be additionally disposed within the tunnel system to create various encapsulated tunnel portions optionally having differing pressures and temperatures. The tunnel system may be airtight and sealed from external, hostile atmospheric conditions, designed to facilitate safe living and work conditions in the tunnel systems and to facilitate safe movement of people and equipment between tunnels, shafts and the surface of the planetary body. Tunnel systems are defined as any variety of man-made mines and tunnels or naturally occurring tunnels such as lava tubes or caverns and the like.

17 Claims, 4 Drawing Sheets

SYSTEM AND METHOD FOR SEALING AND PRESSURIZING ENCLOSED FACILITIES VIA PREFABRICATED MODULES, PLUGS, DOORS, AND INSERTS

TECHNICAL FIELD

The embodiments generally relate to airtight tunnel systems and method of making the same.

BACKGROUND

A method for creating and maintaining pressures and temperatures similar to that of Earth's ambient pressures and temperatures may include utilizing prefabricated modules, inserts, doors or plugs within an enclosed facility such as a mine to seal and pressurize the enclosed facilities and provide a safe environment in which people and equipment may move, work, and live or move from pressurized to non-pressurized sections, such as to and from the surface of a planetary body as required.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the embodiments described herein relate to a method of sealing and pressurizing underground mines or tunnels, or underground facilities in planetary bodies with atmospheric pressures or temperatures differing from that of earth. The method may allow for the sealing and pressurizing of parts or all of an underground facility or enclosed facility or for depressurizing or over pressurizing enclosed facilities.

A method of sealing and pressurizing an enclosed facility may include providing a plug within a tunnel or shaft and sealing and pressurizing the tunnel or shaft on either side of the plug.

A method of sealing and pressurizing an enclosed facility may include providing a prefabricated plug, or insert, including a frame and sealable doors, wherein the prefabricated plug, or insert, may be affixed to the interior of a tunnel system.

A system for sealing and pressurizing an enclosed facility may include multiple plugs including complementary profiled inserts disposed within cutbacks of a tunnel wall to create sealed and pressurized habitats.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1A:
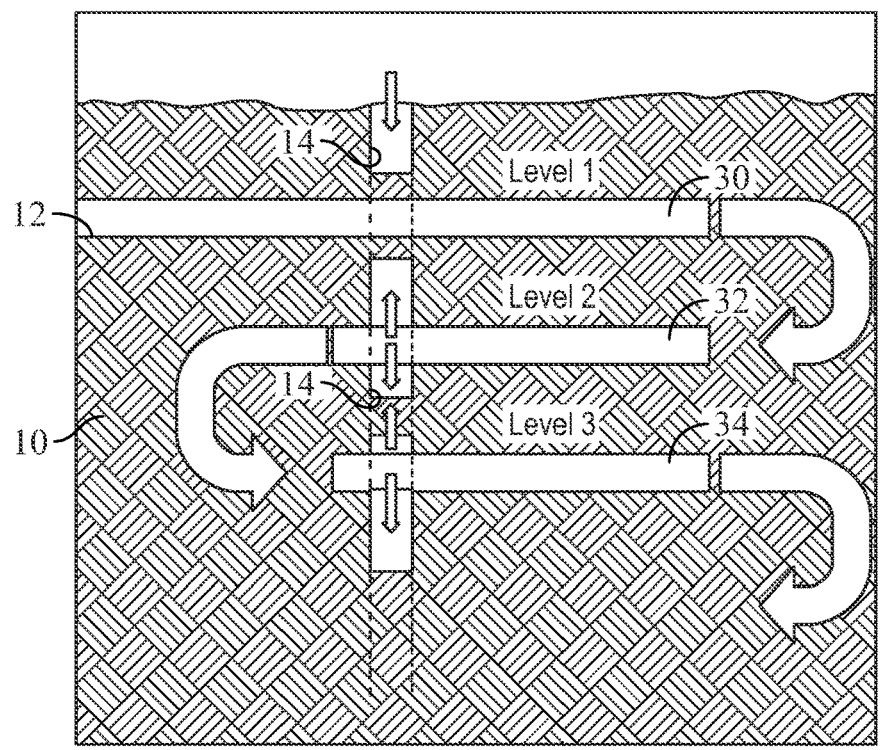
FIGS. 1A, 1B, and 1C illustrate different processes used for sealing and pressurizing shafts of enclosed facilities, which may include utilizing prefabricated modules, plugs or inserts.

The specific details of the single embodiment or variety of embodiments described herein are to the described system and methods of use. Any specific details of the embodiments are used for demonstration purposes only and no unnecessary limitations or inferences are to be understood from there.

It is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, the term "plug" or variations on the term "plug" may include any pressurized door, capsule-module, prefabricated door module, seal, slab, cement, or other device sufficient for providing a sealable, airtight doorway within a tunnel or shaft capable of maintaining different environments or pressures on either side of the plug.

In general, the embodiments described herein relate to a method of sealing and pressurizing underground mines or tunnels, or underground facilities in planetary bodies with atmospheric pressures or temperatures differing from that of earth. As used herein, the term "tunnel" or variations on the term "tunnel" refer to man-made underground mines and tunnels as well as natural tunnels such as lava tubes, underground cavern systems, caves, and the like. The method may allow for the sealing and pressurizing of parts or all of an underground facility or enclosed facility via a plurality of sealable doors or prefabricated plugs.

In general, the method may include sinking a tunnel into dirt, rock, or any similar substance including providing optional shafts, insets, blowback insets, openings, or the like. Tunnels may be snaked, bent, or turn to reduce or minimize back-blast within the tunnel system. The tunnel may include multiple openings to the surface, such as but not limited to, openings to ambient planetary environments. A plug may be installed within at least one opening and in various locations throughout the tunnel to define various encapsulated portions of the tunnel that may each individually have varying environmental pressures and temperatures. Encapsulated portions of the tunnel may be pressure tested to ensure a proper seal within the encapsulation. According to some embodiments, a first opening may be defined within the surface of a planetary body, and various tunnels, shafts, insets, or openings may be defined within the planetary body. According to one variation, a first tunnel may be dug and sealed with one or more prefabricated pressure sealable door and the tunnel may be pressurized and sealed from the exterior, planetary environment. A second tunnel may be defined adjacent to the surface of the planetary body and a second prefabricated pressure sealable door may be installed. Subsequently, a second opening in the surface of the planetary body may be provided leading to the second prefabricated pressure sealable door such that a second entryway into the sealed tunnel may be provided without exposing the interior of the tunnel or tunnel systems to the planetary environment.

According to some variations, an above ground facility may be disposed over a first opening or a second opening in the planetary body leading to the tunnel system previously described. Various additional safety doors may be installed within tunnel system to ensure safety of the internal environment and reduce the chance of fault or depressurization of the tunnel environment.

A plug may be inserted into a tunnel or shaft by forming a slot perpendicular to the tunnel or shaft and disposing a frame for the plug within the slot and rock bolting or securing the frame over rubber, plastic, or the like to seal the frame within the slot. Pressurized doors may be installed within the frame to provide for a sealable module door within a tunnel system. According to some variations, multiple prefabricated plugs may be installed within a tunnel or shaft to define and encapsulation which may have variable pressure or adjustable pressure therein. According to some variations, encapsulations may include multiple pressurized modules therein such that, as a non-limiting example, equipment may be stored at a first pressure separate from a human accessible pressurized module at a second pressure, or to facilitate movement of people and equipment between areas of variable pressure and or temperature, such as the surface of a planetary body.

Referring to FIG. 1A, a tunnel system may define a plurality of tunnels 30, 32, and 34 each including a respective tunnel surface 12. At least one shaft 14 may be defined by the tunnel system within the surface of a planetary body 10. The process may include shaft 14 being defined up or down from each level in a tunnel system, or from the surface of a planetary body so that the ambient temperatures and pressures of each working area are maintained so as to avoid catastrophic decompression of pressurized areas.

Figure 1B:
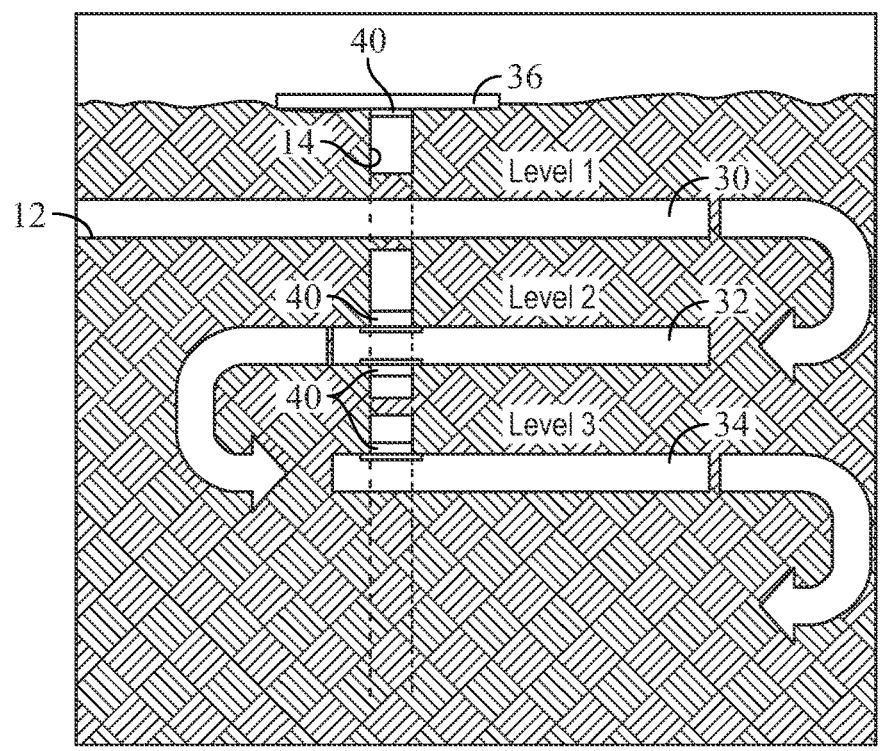

Referring to FIG. 1B, a tunnel system may include at least one plug 40 disposed within portions of the at least one shaft 14 sealing the shaft 14 from the plurality of tunnels 30, 32, and 34 and a slab 36 disposed over the entrance of the shaft 14. The at least one shaft 14 may be initially partially defined between the at least one tunnels 30, 32, and 34 and at least one plug may be disposed within the at least one shaft 14 prior to fully defining the shaft between each of the at least one tunnels 30, 32, and 34. In this way, portions of the shaft 14 or tunnels 30, 32, 34 may be safely dug or defined within the planetary body 10 without affecting pressurized and safe operating environments within the tunnel system.

Figure 1C:
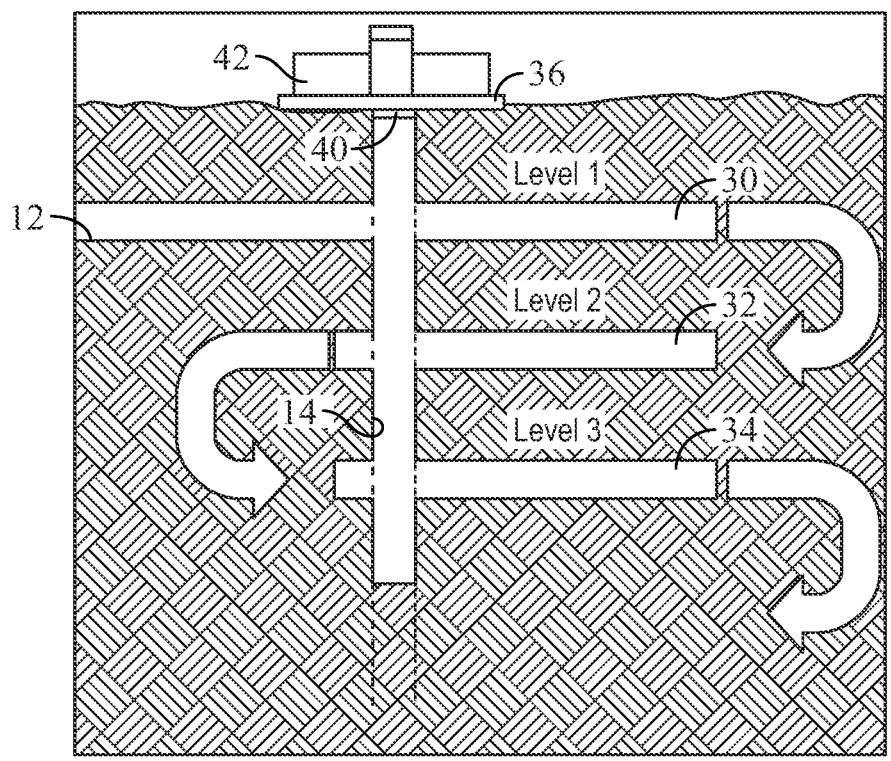

Referring to FIG. 1C, a tunnel system may include at least one shaft 14 connecting a plurality of tunnels 30, 32, 34 including a plug 40 that may be disposed at various locations throughout the tunnel system. An above ground facility 42 may be in operable communication with the slab 36 and plug 40 it may include an elevator or similar system to allow movement within the shaft 14 and plurality of tunnels 30, 32, and 34. The process may involve laying a seal such as conveyor belt, or other airtight material, over a sufficient surface area above the shaft, then covering it with plug 40, slab 36, and above ground facility 42 which is then sealed and pressurized. The sealing of shaft 14 is then finalized from within the enclosed shaft 14 structure, as per FIG. 1B. A variation of this is where a natural tunnel such as a lava tube or cavern that has an opening exposed above at the surface; in these cases, a structure may be connected to the floor, then rockbolted or otherwise connected to the plug 40 ceiling and or slab 36 to help maintain a pressure seal and for construction of shafts, elevators or other mechanisms and facilities used to move people and equipment between areas of different ambient temperature and pressure, such as the tunnel system and the surface.

Figure 2:
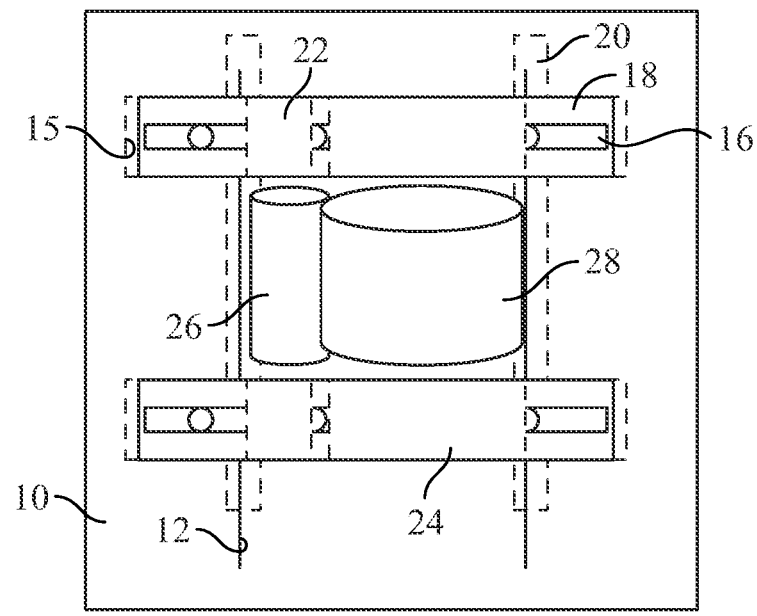
FIG. 2 illustrates a portion of a modular system for sealing and pressurizing enclosed facilities via prefabricated modules to allow for people and equipment to move from pressurized to lesser or non-pressurized areas of tunnels as well as to and from the surface of a planetary body.

Referring to FIG. 2, a tunnel system may include a sealable and pressurized encapsulation within a planetary body 10. A tunnel may include a tunnel surface 12 and at least one slot 15 defined within a portion of the tunnel surface 12 approximately perpendicular to the run of the tunnel. Frames 16 may be disposed within the slot 15 and rock bolted to the tunnel surface 12 over rubber 18, plastic, or the like and subsequently cemented 20 into the slot 15. Sealable, pressurized doors 22, 24 may be in operable communication with the frame 16. According to some variations the encapsulation may include a first pressurized module 26 constructed and arranged to allow persons therein. The encapsulation may include a second pressurized module 28 constructed and arranged to house equipment or the like, or the area between two fames 16 retained as a chamber or room, each of the model 26, 28 or the chamber capable of being pressurized or depressurized to facilitate movement of people and equipment between areas of different ambient temperature and pressure.

Figure 3:
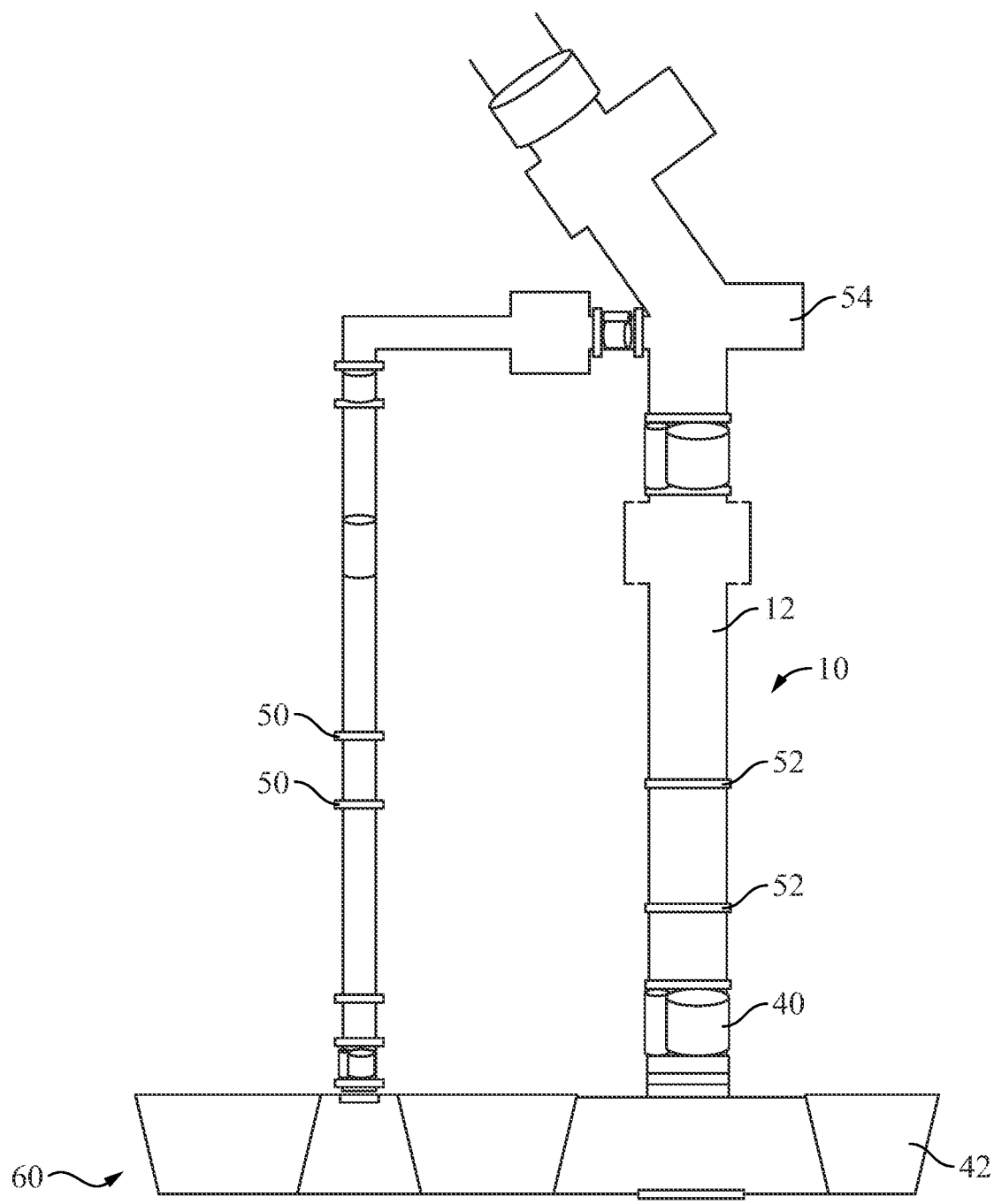
FIG. 3 illustrates portions a system for sealing and pressurizing enclosed facilities via prefabricated modules.

FIG. 3 depicts a plan view of a tunnel system including an above ground facility 42 in the natural environment 60 of a planetary body 10. The tunnel system may include a plurality of tunnels defining a tunnel surface 12 and various tunnel features such as insets 54 and bends in the tunnel which are designed to reduce back-blast from tunnel evacuation. At least one plug 40 may sealingly close off the tunnel system from the natural environment 60. A plurality of additional safety doors 50, 52 may provide a means for further sealing off the tunnel system from the natural environment 60 but also to seal off areas that may contain joints, faults, cavities, or loose, soft, porous or unstable rock formations, slabs of ice composed of $CO_2$, water or other substance that may represent significant risk factors or may impact the pressurization and safety within the tunnel surface 12. The same methods may apply for sealing inside lava tube tunnel and caverns or connecting them to openings at the surface, such as on the side of a hill, mound or ridge.

Figure 4:
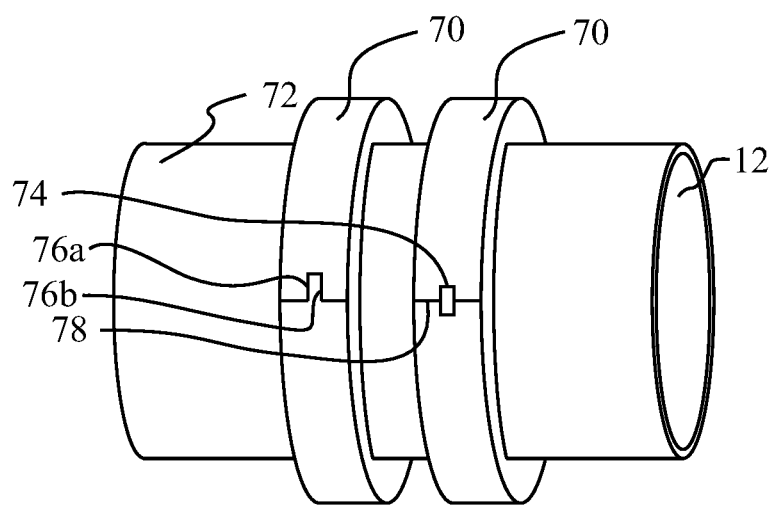
FIG. 4 illustrates a portion of a modular system for sealing and pressurizing enclosed facilities to establish inserts and plugs for tunnel doors, which may be utilized to separate sections of tunnels, chambers or rooms used for living or work, or to create chambers, rooms, or hold prefabricated modules that may be utilized to facilitate movement of people and equipment between areas that may be similar to Earth's ambient temperatures and pressures, from those that are not.

FIG. 4 illustrates a portion of a modular system for sealing and pressurizing enclosed facilities via prefabricated modules including inserts 70 that may extend from at least a portion of a tunnel surface 12 or outer wall 72. Inserts 70 may be disposed on exterior portions of a plug as previously described. Inserts 70 may mechanically interface with the natural environment of a planetary body to connect, seal, or pressurize habitats, doors, walls, or other structures within a tunnel system. According to some embodiments, single or multiple cutbacks heavy dug or cut into a tunnel wall or shaft to receive the inserts therein. Inserts may be cemented, bolted, or otherwise connected to a tunnel wall. An internal door frame, seal, panels, or other structures including sealing membranes may be inserted with any chance are and fastened to seal a tunnel or shaft. In this way, the system may create a solid structure including a blast door or wall at either end constructed and arranged to withstand repeated back-blast, compression, or decompression. The system may further be constructed and arranged to allow tunnel space on either side of a plug to be sealed and pressurized at standard earth temperature and pressures. According to some embodiments, inserts may be prefabricated as part of a plug as previously described. Inserts 70 may take a variety of sizes, shapes, materials and variations each constructed and arranged to facilitate an airtight seal between a first module and a second module and securing modules or tunnels within the natural environment of a planetary body. Inserts 70 may be rock bolted to the tunnel walls and bolted or welded together or to capsule module or habitats inserted in tunnel surface 12 to obtain a pressurized seal. Inserts 70 may or may not be prefabricated or connected together as components. Where inserts 70 are prefabricated, then inserted into outer wall 72, they may be affixed together by a series of bolts, levers, or welded, or via other means and a material placed between the insert 70 and tunnel wall to aid with pressurization. Where insert 70 are assembled as components, the insert 70 may include complimentary profiled connections 76a and 76b or abutting joint 78 having a mechanically connecting key 74, or similar. Complimentary profiled connections 76a and 76b may take a variety of sizes, shapes, and variations each constructed and arranged to facilitate a mechanical connection between portions of an insert 70. According to some embodiments, the complementary profiled connections 76a and 76b may include partial or near complementary profiles. Tunnel surface 12 may take a variety of sizes, shapes, and variations and the cylindrical tunnel depicted in FIG. 4 should not be considered limiting. The tunnel surface 12 and insert(s) 70 may support the structure of modules and tunnels and help the system remain pressurized and withstand repeated back-blast from evacuation of underground tunnels or shafts. Additional components of inserts 70 may be affixed or rock bolted to tunnel walls and connected to blast doors or any inserted modules to absorb back-blast or sudden changes in pressurization or depressurization of tunnels 12 to reduce the chance of catastrophic failure in tunnels.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a method of sealing and pressurizing a tunnel system may include the steps of disposing at least one plug within a first slot of at least one tunnel at least one tunnel in a planetary body, the at least one tunnel defining an opening to an exterior environment; sealing the at least one tunnel from the exterior environment; disposing at least one second plug within a second slot of at least one second tunnel; sealing the at least one second tunnel from the exterior environment; and defining a shaft in fluid communication with the at least one tunnel and at least one second tunnel, wherein the at least one plug and at least one second plug facilitate the sealing and pressurizing of the tunnel system on a planetary body having an exterior environment including atmospheric pressures unsafe for humans.

Variation 2 may include a method of sealing and pressurizing a tunnel system as in variation 1, further including performing at least one of pressurizing or depressurizing the at least one tunnel for individuals there in prior to disposing at least one second plug within a second slot of at least one second tunnel.

Variation 3 may include a method of sealing and pressurizing a tunnel system as in any of variations 1 through 2, further including performing at least one of pressurizing or depressurizing the at least one second tunnel for individuals therein prior to defining a shaft in fluid communication with the at least one tunnel and at least one second tunnel.

Variation 4 may include a method of sealing and pressurizing a tunnel system as in any of variations 1 through 3, wherein the at least one plug and at least one second plug each include a frame and at least one sealable, airtight door disposed within the frame.

Variation 5 may include a method of sealing and pressurizing a tunnel system as in any of variations 1 through 4, wherein the at least one plug and at least one second plug are each prefabricated prior to being disposed within the first slot and second slot, respectively.

Variation 6 may include a method of sealing and pressurizing a tunnel system that may include the steps of defining at least one tunnel in a planetary body, the at least one tunnel defining an opening to an exterior environment and a first slot; disposing at least one plug within the first slot of the at least one tunnel; sealing the at least one tunnel from the exterior environment; performing at least one of pressurizing or depressurizing the at least one tunnel for individuals there in; defining at least one second tunnel including a second slot in the planetary body; disposing at least one second plug within the second slot of the at least one second tunnel; sealing the at least one second tunnel from the exterior environment; performing at least one of pressurizing or depressurizing the at least one second tunnel for individuals therein; and defining a shaft in fluid communication with the at least one tunnel and at least one second tunnel, wherein the at least one plug and at least one second plug facilitate the sealing and pressurizing of the tunnel system on a planetary body having an exterior environment including atmospheric pressures unsafe for humans.

Variation 7 may include a method of sealing and pressurizing a tunnel system as in variation 6, wherein the at least one plug and at least one second plug each include a frame and at least one sealable, airtight door disposed within the frame.

Variation 8 may include a method of sealing and pressurizing a tunnel system as in any of variations 6 through 7, wherein the at least one plug and at least one second plug are each prefabricated prior to being disposed within the first slot and second slot, respectively.

Variation 9 may include a method of sealing and pressurizing a tunnel system as in any of variations 6 through 8, further including at least one insert disposed on an exterior portion of a plug.

Variation 10 may include a method of sealing and pressurizing a tunnel system as in any of variations 6 through 9, wherein the at least one insert is constructed and arranged to facilitate connection of a plug to at least one of a tunnel, structure, or planetary body.

Variation 11 may include a method of sealing and pressurizing a tunnel system as in any of variations 6 through 10, further including disposed an above ground facility over the opening in the planetary body leading to the tunnel system previously described.

Variation 12 may include a method of sealing and pressurizing a tunnel system as in any of variations 6 through 11, further including a plurality of additional plugs within the tunnel system to create various encapsulated tunnel portions.

Variation 13 may include a method of sealing and pressurizing a tunnel system as in any of variations 6 through 12, wherein the various encapsulated tunnel portions are constructed and arranged to house differing pressures and temperatures between encapsulated tunnel portions.

Variation 14 may include a method of sealing and pressurizing a tunnel system as in any of variations 6 through 13, wherein facilitating the sealing and pressurizing of the tunnel system on a planetary body having an exterior environment including atmospheric pressures unsafe for humans includes sealing and pressurizing of the tunnel system to provide an internal environment safe for humans.

Variation 15 may include a system for sealing and pressurizing a tunnel system that may include at least one tunnel in a planetary body defining an opening to an exterior environment; a first slot defined by the at least one tunnel; at least one plug within the first slot of the at least one tunnel, the at least one plug being constructed and arranged for sealing the at least one tunnel from the exterior environment; and a shaft in fluid communication with the at least one tunnel, wherein the at least one plug facilitates the sealing and pressurizing of the tunnel system on a planetary body having an exterior environment including atmospheric pressures unsafe for humans.

Variation 16 may include a system for sealing and pressurizing a tunnel system as in variation 15, further including at least one second tunnel in the planetary body; a second slot defined by the at least one second tunnel; and at least one second plug disposed within the second slot of the at least one second tunnel, the at least one second plug being constructed and arranged for sealing the at least one second tunnel from the exterior environment.

Variation 17 may include a system for sealing and pressurizing a tunnel system as in any of variations 15 through 16, wherein the shaft is in fluid communication with the at least one second tunnel, wherein the at least one second plug facilitates the sealing and pressurizing of the tunnel system on a planetary body having an exterior environment including atmospheric pressures unsafe for humans.

Variation 18 may include a system for sealing and pressurizing a tunnel system as in any of variations 15 through 17, wherein the at least one second plug is at least one prefabricated second plug including a frame and sealable doors, wherein the at least one prefabricated second plug may be affixed to the interior of a tunnel system.

Variation 19 may include a system for sealing and pressurizing a tunnel system as in any of variations 15 through 18, wherein the at least one plug is at least one prefabricated first plug including a frame and sealable doors, wherein the at least one prefabricated first plug may be affixed to the interior of a tunnel system.

Variation 20 may include a system for sealing and pressurizing a tunnel system as in any of variations 15 through 19, wherein at the at least one prefabricated first and second plugs may include three or more prefabricated plugs constructed and arranged to encapsulate a plurality of tunnel portions.

Variation 21 may include a system for sealing and pressurizing a natural tunnel such as a lava tube or cavern that has an opening exposed above at the surface; wherein, a structure may be connected to the floor inside the lava tube or cavern, then rockbolted or otherwise connected to plugs or slabs connected to the ceiling, arranged to maintain a pressure seal or for construction of shafts, elevators or other mechanisms and facilities used to move people and equipment between areas of different ambient temperature and pressure, such as the tunnel system and the surface.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. A method of sealing and pressurizing a tunnel system, comprising:
    disposing at least one first plug within a first slot of at least one first tunnel in a planetary body, the at least one first tunnel defining an opening to an exterior environment;
    sealing the at least one first tunnel from the exterior environment;
    disposing at least one second plug within a second slot of at least one second tunnel;
    sealing the at least one second tunnel from the exterior environment; and
    defining a shaft in fluid communication with the at least one first tunnel and the at least one second tunnel, wherein the at least one first plug and the at least one second plug facilitate the sealing and pressurizing of the tunnel system on the planetary body having the exterior environment comprising atmospheric pressures unsafe for humans, wherein:
    the at least one first plug and the at least one second plug comprise at least one prefabricated plug including a plurality of frames and sealable doors;
    the at least one prefabricated plug is affixed to the interior of the tunnel system; and
    wherein the first slot and the second slot comprise the plurality of frames disposed within the first slot and the second slot and rock bolted to a first tunnel surface and to a second tunnel surface and cemented into the first slot and into the second slot.

2. The method of sealing and pressurizing the tunnel system as in claim 1, further comprising performing at least one of pressurizing or depressurizing the at least one first tunnel for the humans there in prior to disposing the at least one second plug within the second slot of the at least one second tunnel.

3. The method of sealing and pressurizing the tunnel system as in claim 1, further comprising performing at least one of pressurizing or depressurizing the at least one second tunnel for the humans therein prior to defining the shaft in fluid communication with the at least one first tunnel and the at least one second tunnel.

4. The method of sealing and pressurizing the tunnel system as in claim 3, wherein the at least one first plug and the at least one second plug are each prefabricated prior to being disposed within the first slot and second slot, respectively.

5. The method of sealing and pressurizing the tunnel system as in claim 1, wherein facilitating the sealing and pressurizing of the tunnel system on the planetary body having the exterior environment comprising atmospheric pressures unsafe for individuals comprises sealing and pressurizing of the tunnel system to provide an internal environment safe for individuals.

6. A method of sealing and pressurizing a tunnel system, comprising:
defining at least one first tunnel in a planetary body, the at least one first tunnel defining an opening to an exterior environment and a first slot;
disposing at least one first plug within the first slot of the at least one first tunnel;
sealing the at least one first tunnel from the exterior environment; performing at least one of pressurizing or depressurizing the at least one first tunnel for individuals therein;
defining at least one second tunnel comprising a second slot in the planetary body;
disposing at least one second plug within the second slot of the at least one second tunnel, sealing the at least one second tunnel from the exterior environment;
performing at least one of pressurizing or depressurizing the at least one second tunnel for individuals therein; and
defining a shaft in fluid communication with the at least one first tunnel and the at least one second tunnel, wherein the at least one first plug and the at least one second plug facilitate the sealing and pressurizing of the tunnel system on the planetary body having the exterior environment comprising atmospheric pressures unsafe for the individuals wherein:
the at least one first plug and the at least one second plug comprise at least one prefabricated plug including a plurality of frames and sealable doors;
the at least one prefabricated plug is affixed to the interior of the tunnel system; and
wherein the first slot and the second slot comprise the plurality of frames disposed within the first slot and the second slot and rock bolted to a first tunnel surface and to a second tunnel surface and cemented into the first slot and into the second slot.

7. The method of sealing and pressurizing the tunnel system as in claim 6, wherein the at least one first plug and the at least one second plug are each prefabricated prior to being disposed within the first slot and second slot, respectively.

8. The method of sealing and pressurizing the tunnel system as in claim 6 further comprising at least one insert disposed on an exterior portion of the at least one first plug and the at least one second plug.

9. The method of sealing and pressurizing the tunnel system as in claim 8, wherein the at least one insert is constructed and arranged to facilitate connection of the at least one first plug and the at least one second plug to at least one structure.

10. The method of sealing and pressurizing the tunnel system as in claim 6, further comprising disposed an above ground facility over the opening to the exterior environment in the planetary body leading to the tunnel system.

11. The method of sealing and pressurizing the tunnel system as in claim 6, further comprising a plurality of additional plugs within the tunnel system to create various encapsulated tunnel portions.

12. The method of sealing and pressurizing the tunnel system as in claim 11, wherein the encapsulated tunnel portions are constructed and arranged to house differing pressures and temperatures between the encapsulated tunnel portions.

13. A system for sealing and pressurizing a tunnel system, comprising:
at least one first tunnel in a planetary body defining at least one opening to an exterior environment;
a first slot defined by the at least one first tunnel;
at least one first plug within the first slot of the at least one first tunnel, the at least one first plug configured for sealing the at least one first tunnel from the exterior environment;
a shaft in fluid communication with the at least one first tunnel, wherein the at least one plug facilitates the sealing and pressurizing of the tunnel system on the planetary body having the exterior environment comprising atmospheric pressures unsafe for individuals;
at least one second tunnel in the planetary body:
a second slot defined by the at least one second tunnel; and
at least one second plug disposed within the second slot defined by the at least one second tunnel, the at least one second plug configured for sealing and pressurizing of the at least one second tunnel from the exterior environment comprising atmospheric pressures unsafe for the individuals,
wherein:
the at least one second plug comprises at least one prefabricated second plug including a frame and sealable doors;
the at least one prefabricated second plug is affixed to the interior of the tunnel system; and
wherein the first slot comprises a plurality of frames disposed within the first slot and rock bolted to a first tunnel surface and cemented into the first slot.

14. The system for sealing and pressurizing the tunnel system as in claim 13, wherein the shaft is in fluid communication with the at least one second tunnel.

15. The system for sealing and pressurizing the tunnel system as in claim 13, wherein the at least one first plug comprises at least one prefabricated first plug affixed to the interior of the tunnel system.

16. The system for sealing and pressurizing the tunnel system as in claim 15, wherein the at least one prefabricated first and second plugs comprise three or more prefabricated plugs configured to encapsulate a plurality of tunnel portions.

17. The system for sealing and pressurizing the tunnel system as in claim 15, wherein the at least one first tunnel, the at least one second tunnel, and the shaft are in fluid communication with one another and in fluid communication with at least one opening to a surface of the planetary body.

* * * * *